(12) United States Patent
Tourret et al.

(10) Patent No.: US 12,504,850 B2
(45) Date of Patent: Dec. 23, 2025

(54) METHODS AND APPARATUS FOR DISPLAY NOISE CANCELING IN A TOUCH SENSING SYSTEM

(71) Applicant: NXP B.V., Eindhoven (NL)

(72) Inventors: Jean-Robert Tourret, Cormelles le Royal (FR); Franck Goussin, Blainville sur Orne (FR); Frederic Darthenay, Luc sur Mer (FR); Vincent Geffroy, Cuverville (FR)

(73) Assignee: NXP B.V., Eindhoven (NL)

( * ) Notice: Subject to any disclaimer, the term of this patent is extended or adjusted under 35 U.S.C. 154(b) by 14 days.

(21) Appl. No.: 18/764,690

(22) Filed: Jul. 5, 2024

(65) Prior Publication Data

US 2025/0036238 A1 Jan. 30, 2025

(30) Foreign Application Priority Data

Jul. 24, 2023 (EP) .................................. 23306277

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ..... G06F 3/0418; G06F 3/044; G06F 3/04182
See application file for complete search history.

(56) References Cited

U.S. PATENT DOCUMENTS

| | | | |
|---|---|---|---|
| 9,489,072 B2 | 11/2016 | Philipp | |
| 10,627,843 B2 | 4/2020 | Tourret | |
| 11,586,308 B2 | 2/2023 | Dai et al. | |
| 2006/0227119 A1* | 10/2006 | Hsieh | G06F 3/044 345/173 |
| 2011/0115729 A1* | 5/2011 | Kremin | G06F 3/0446 345/173 |
| 2013/0063396 A1* | 3/2013 | Kim | G06F 3/04182 345/173 |
| 2013/0265242 A1 | 10/2013 | Richards et al. | |
| 2014/0292375 A1 | 10/2014 | Angelini et al. | |
| 2016/0378222 A1* | 12/2016 | Cheong | G06F 3/04182 345/174 |
| 2017/0090673 A1* | 3/2017 | Kim | G06F 3/0418 |
| 2022/0342434 A1 | 10/2022 | Meng et al. | |
| 2022/0357832 A1 | 11/2022 | Chen et al. | |

* cited by examiner

*Primary Examiner* — Hong Zhou

(57) ABSTRACT

A method for display noise canceling in a touch sensing system includes measuring a first feedback voltage of a feedback node resistively coupled to a line voltage of a capacitive touch panel, the line voltage formed by a continuous wave output of an amplifier responsive to a reference voltage difference between the first feedback voltage and a reference voltage. A second feedback voltage is clamped to a first upper voltage threshold in response to a first voltage difference between the first feedback voltage and the reference voltage being greater than the first upper voltage threshold. The second feedback voltage is clamped to a first lower voltage threshold in response to the first voltage difference being less than the first lower voltage threshold.

20 Claims, 10 Drawing Sheets

METHODS AND APPARATUS FOR DISPLAY NOISE CANCELING IN A TOUCH SENSING SYSTEM

CROSS-REFERENCE TO RELATED APPLICATIONS

This application claims the priority under 35 U.S.C. § 119 of European Patent application no. 23306277.7, filed on 24 Jul. 2023, the contents of which are incorporated by reference herein.

FIELD

This disclosure relates generally to touch sensitive display systems, and more specifically to reducing the electrical interference coupled to a touch panel from an underlying display system.

BACKGROUND

Touch panels used for touch detection may lay very close to the display system to which they control. Each pixel from the display system is strongly driven by large voltage pulses, which may couple to the touch panel electrodes via a common and not always low-ohmic ground, at the display image refresh rate. The electric signals used to energize the touch panel's electrodes have to withstand this coupled electrical interference ("interferers"), which may be in the frequency band of the touch panel sensor, hence it is difficult to filter out. Consequently, the circuits within the touch sensor may saturate from the resulting excessively large signal and thus leave their linear mode of operation and becoming unable to detect the touch event.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for the preservation of touch sensing functionality of a capacitive touch panel in the presence of noise coupled from a coupled display system. In some embodiments, the display system lays physically beneath and proximal to the touch sensing system. Large voltage pulses may be used to activate pixels of the display system. These pulses may also couple into the touch sensing system through a common ground connection. The touch sensing system may use a capacitive touch panel, whose capacitance is altered when touched by a human finger, a stylus or any object having a parasitic capacitance.

The capacitive touch panel is typically driven by a time-variant signal (e.g., a sine wave), which will attenuate when the capacitive load changes due a touch event. An overvoltage or undervoltage on this signal may be detected and attenuated through clamping so that the circuitry that detects the signal distortion will operate reliability without saturation.

Figure 1:
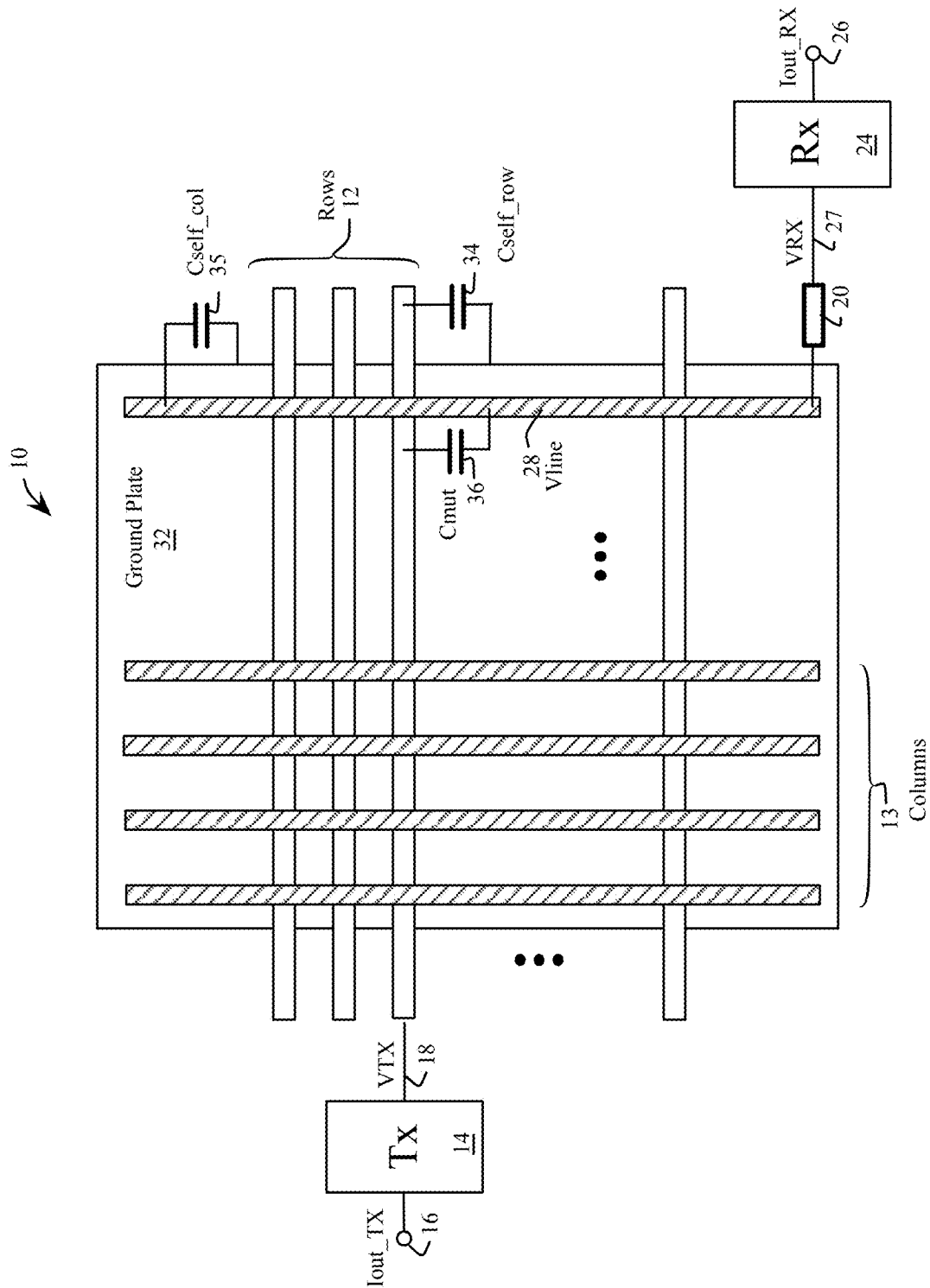
FIG. 1 is a schematic plan view of an embodiment of a capacitive touch panel with electrical interference from an underlying display system.

FIG. 1 shows a plan view of an embodiment 10 of a capacitive touch panel having a plurality of rows 12 and columns 13. In some embodiments of a capacitive touch panel, a plurality of parallel rows are arranged orthogonal to a plurality of parallel columns to form a matrix, where a location of a finger touch to the panel is identified by a respective signal increase or decrease of an intersecting row and column. The row 12 may be driven by a transmitter 14 to provide a current Iout_TX 16 with a voltage signal VTX 18. The signal VTX 18 propagates across the row and couples to the column 13 through the mutual coupling capacitor Cmut 36. The attenuated signal is received by a receiver 24. Concurrently, the receiver 24 also transmits a signal VRX 27 on the respective column 13 with the same amplitude as VTX 18 but with different frequency characteristics. The current Iout_Rx 26 contains information on the attenuated VTX signal (thus affected by the characteristics of the respective row 12), and the reaction of the respective column 13 to the VRX 27 stimulus. Note, that in further descriptions below, VTX 18 and VRX 27 are commonly referred to as Vline 28 as this disclosure relates to how the RX 24 and TX 14 drivers contend with interference on their respective outputs VRX 27 and VTX 18.

Figure 2:
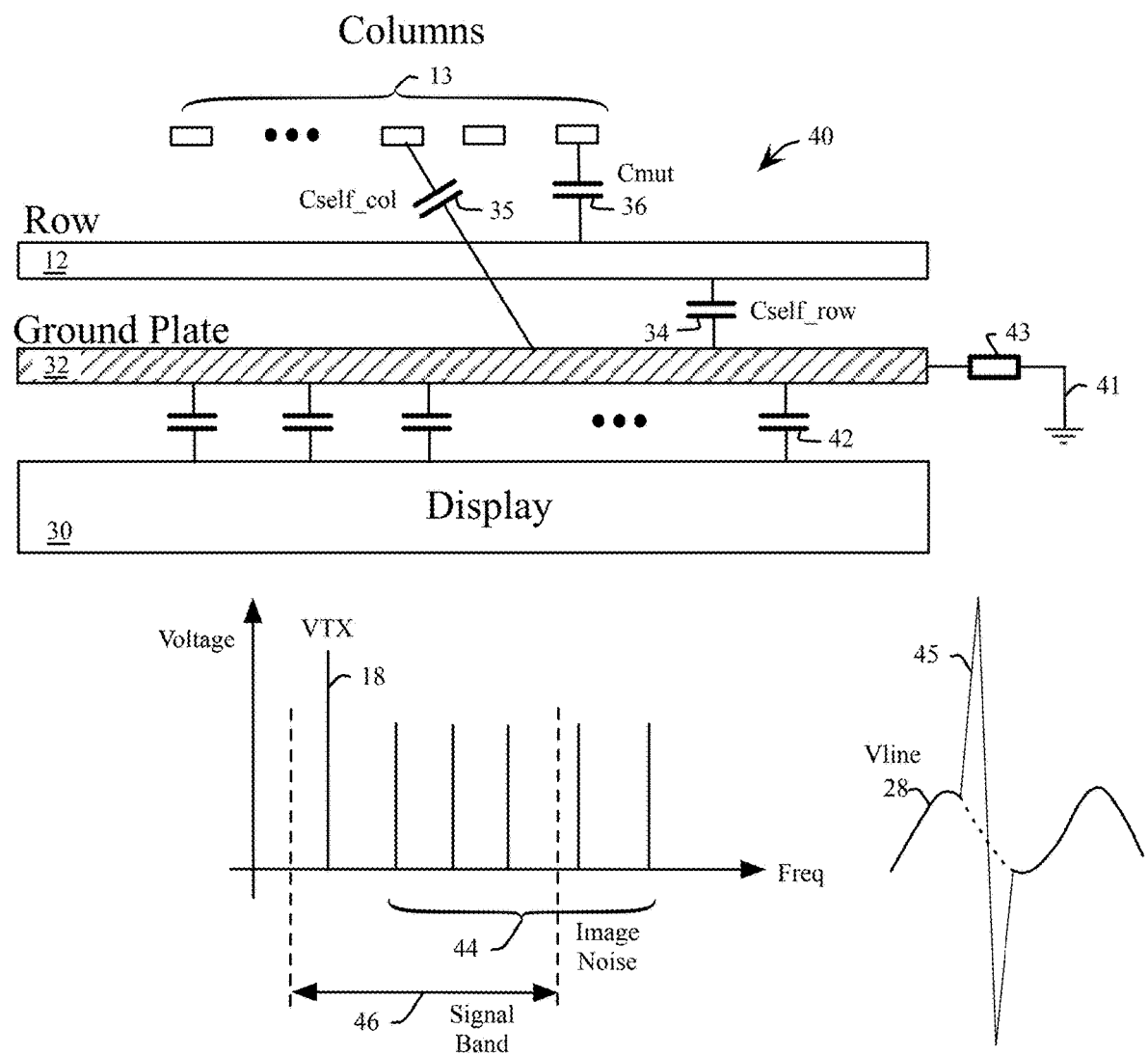
FIG. 2 is a schematic side view of an embodiment of a capacitive touch panel with electrical interference from an underlying display system.

Referring to the embodiment 40 of FIG. 2, with continued reference to FIG. 1, a voltage driven display 30 may couple noise into the respective row 12 or column 13 through a common ground plate 32, either by capacitive coupling through a combination of capacitors 34, 35, 36 and 42, resistively through the ground plate impedance 43 to ground 41 or through a combination of capacitive and resistive coupling. The noise generated by the display 30 may be referred to as image noise 42 and occur within the signal frequency band 46 of the capacitive touch panel 10. The image noise 42 may cause an overvoltage 44 (and similarly an undervoltage) on the Vline 28, thereby saturating circuitry in the receiver 24. Accordingly, the receiver 24 may need to significantly reduce its input gain or will saturate. In either case, the Signal to Noise Ratio (SNR) of the receiver 24 may drop and interfere with the touch sensing functionality.

Figure 3:
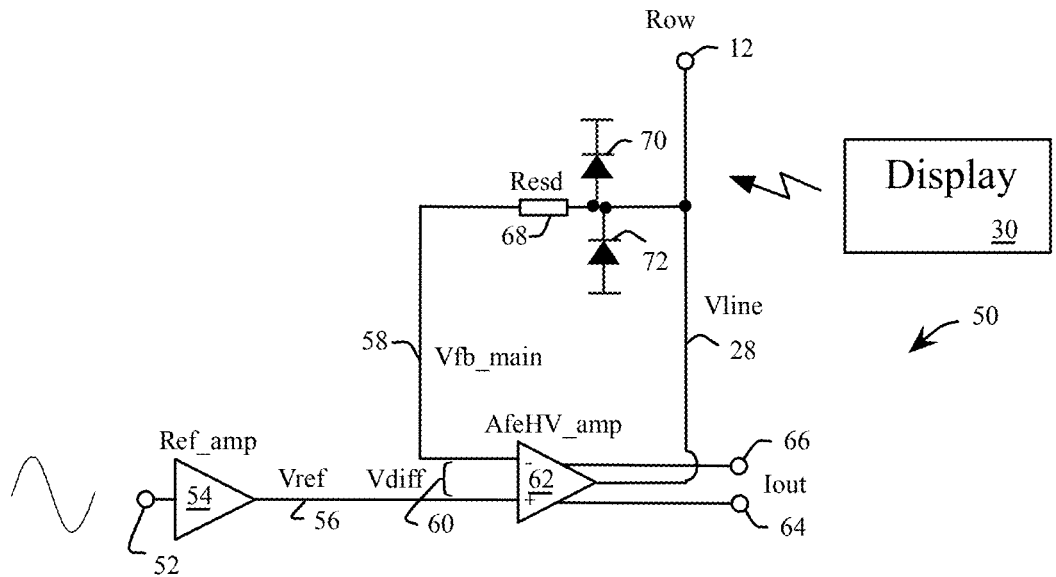
FIG. 3 is schematic view of an embodiment a touch sensitive display circuit.

FIG. 3 shows an embodiment 50 of a touch sensitive display, including a respective row 12 coupled to a display 30. For ease of illustration, the embodiment 50 will be described as part of the transmitter 14 but may be implemented as part of either the transmitter 14 or receiver 24 of FIG. 1. The embodiment 50 amplifies a time-variant (e.g., sinusoidal) signal 52 with a reference amplifier 54 to produce a reference voltage 56. A main feedback voltage 58 on a feedback node is resistively coupled to the line voltage 28 of the row or column 12 of the capacitive touch panel. A reference voltage difference 60 between the reference voltage 56 and the feedback voltage 58 is amplified with an amplifier 62 to generate the line voltage 28. In one embodiment, the amplifier 62 also generates a differential output formed by a positive output 64 and a negative output 66. In other embodiments, the output from the amplifier 62 may be single ended, scaled up or scaled down, provided that this output is proportional to the output current 16 provided to the row or column 12. The embodiment 50 may further include an Electrostatic Discharge (ESD) resistor 68 and a pair of ESD protection diodes 70 and 72 to provide ESD protection, or any ESD protection needed, depending on the required ESD protection level, or technology constraints.

Figure 4:
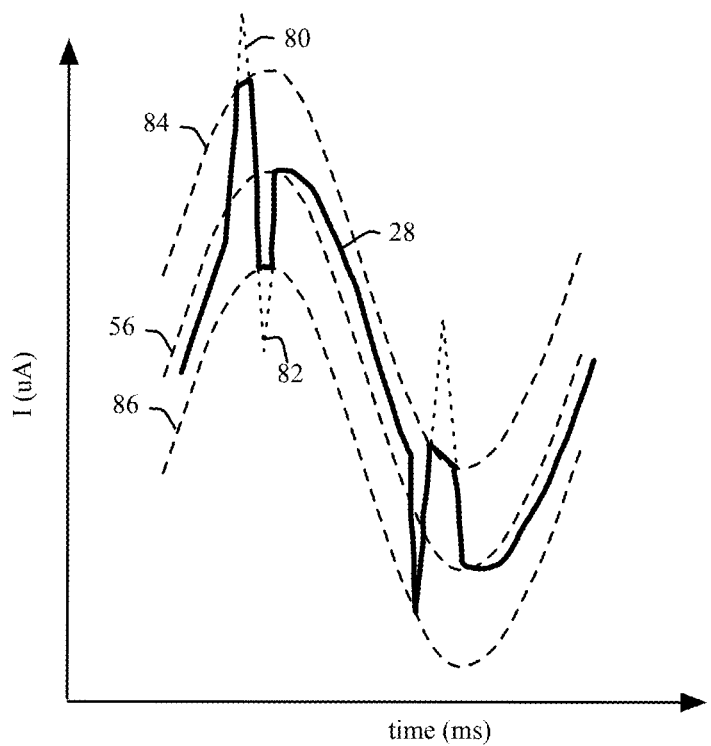
FIG. 4 is a graphical view of electrical interference with the embodiment of FIG. 3.

FIG. 4 shows a graphical view of electrical interference of the embodiment 50 from coupled noise generated by the display 30. The line voltage 28 may be increased by an overvoltage 80 or decreased by an undervoltage 82, thereby causing the receiver 24 to saturate. Accordingly, the overvoltage 80 and undervoltage 82 should be limited or clamped to an upper voltage threshold 84 or a lower voltage threshold 86 respectively.

Figure 5:
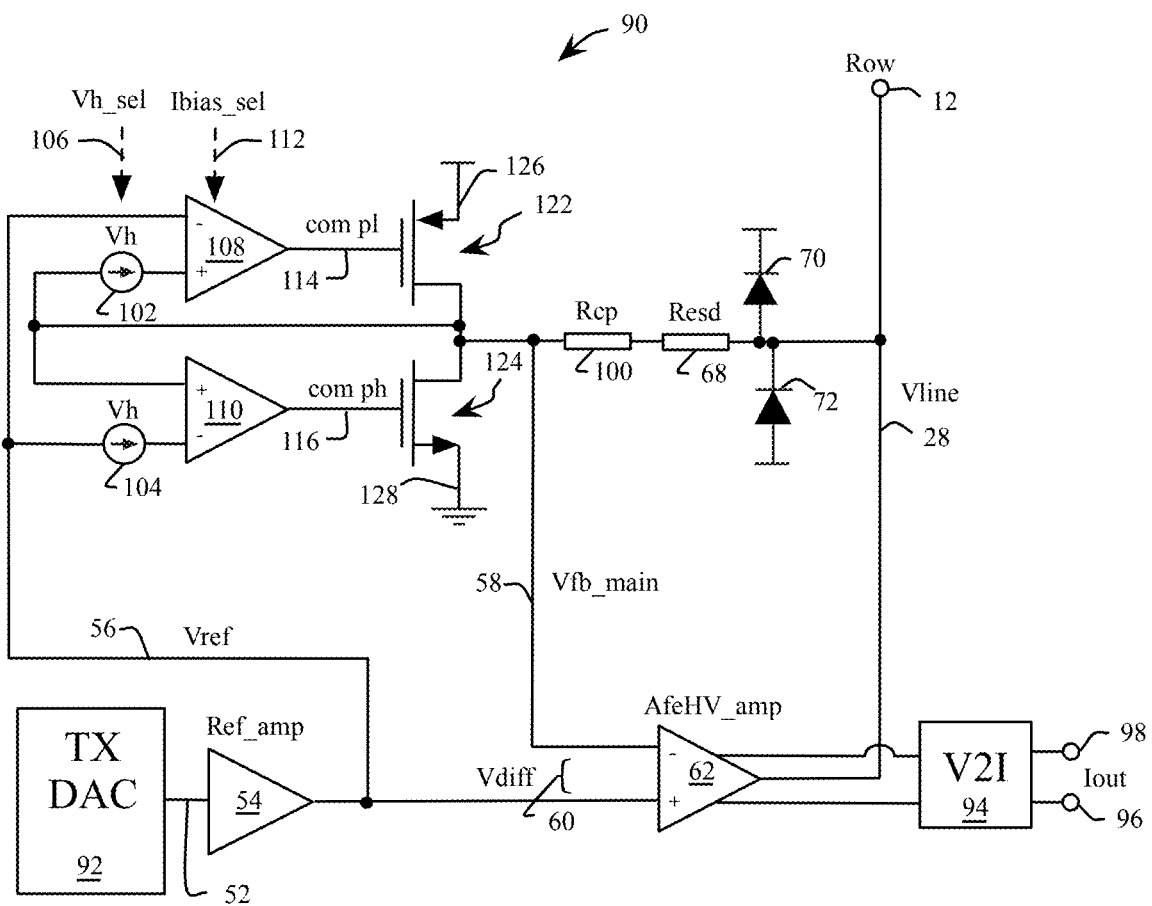
FIG. 5 is a schematic view of an apparatus for display noise cancelling in a touch sensing system, in accordance with an embodiment of the present disclosure.

FIG. 5 shows an apparatus for display noise cancelling in a touch sensing system, in accordance with an embodiment 90 of the present disclosure. The embodiment 90 clamps the overvoltage and undervoltage on the line voltage 28 shown in FIG. 4, to prevent saturation of the circuitry used to detect signal attenuation resulting from of a finger touch on the capacitive touch panel. The embodiment 90 includes a transmitter Digital to Analog Converter (DAC) 92 to generate the time-variant signal 52, and a Voltage to Current converter (V2I) 94 to convert the output of the amplifier 62 a differential output formed by a positive output 96 and a negative output 98.

In some embodiments, an additional correction resistor Rcp 100 is added in series with the ESD resistor 68 to facilitate clamping and correcting an excessive amount of coupled noise on the line voltage 28. In one embodiment, the value of the correction resistor 100 may be used with an ESD resistor 68 of a few thousand ohms to decrease a correction current flowing therethrough to a few microamps. The embodiment 90 provides a correction system composed of two comparators or linear blocks to clamp the feedback voltage 58 (and thereby the line voltage 28) to an upper threshold voltage 102 or to a lower threshold voltage 104. In one embodiment, an absolute value of the upper threshold voltage 102 and the lower threshold voltage 104 is the same and is controllable by a threshold select 106. In another embodiment, the upper threshold voltage 102 and the lower threshold voltage 104 may be programmed to different values. The upper threshold voltage 102 and the lower threshold voltage 104 are each compared against a voltage difference between the feedback voltage 58 and the reference voltage 56 with respective comparators 108 and 110 to generate respective clamping signals 114 and 116, which may activate respective clamping transistors 122 and 124. The respective clamping transistors 122 and 124 operate between a voltage supply 126 and a ground 128.

Figure 6:
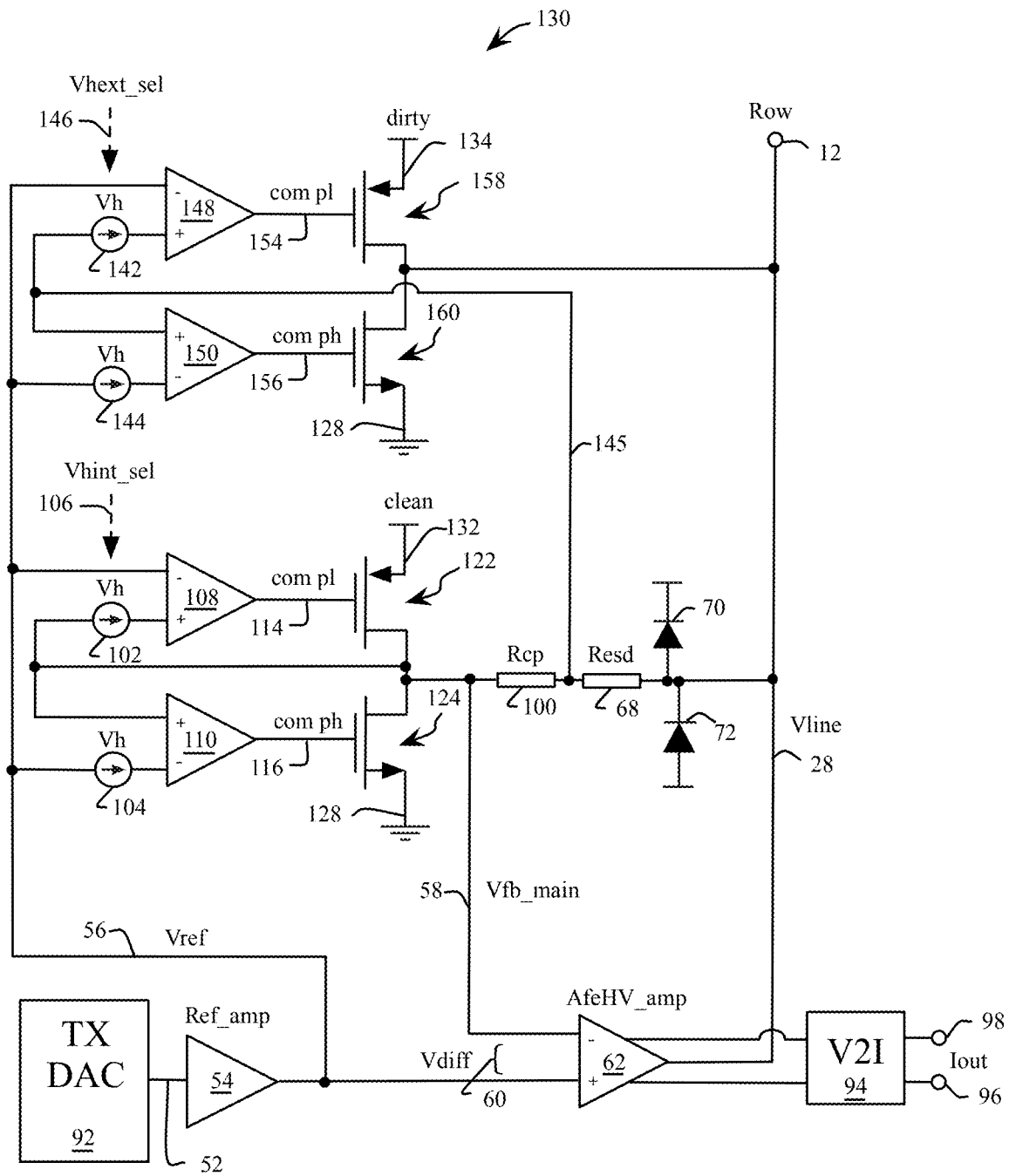
FIG. 6 is a schematic view of another apparatus for display noise cancelling in a touch sensing system, in accordance with an embodiment of the present disclosure.

FIG. 6 shows another apparatus for display noise cancelling in a touch sensing system, in accordance with an embodiment 130 of the present disclosure. With continued reference to FIG. 5, the embodiment 130 of FIG. 6 provides for voltage clamping and correction to the line voltage 28 directly in addition to the indirect correction by clamping the feedback voltage 58. In one embodiment, the system for correcting the feedback voltage 58 is operated from a clean voltage supply 132, compared to the system for directly correcting the line voltage 28, which operates from a dirty voltage supply 134. In this context, a clean voltage supply 132 may have a smaller voltage variation or additional noise filtering compared to the dirty voltage supply 134.

The embodiment 130 provides an additional correction system composed of two comparators or linear blocks to directly clamp the line voltage 28 to an upper threshold voltage 142 or to a lower threshold voltage 144. In one embodiment, an absolute value of the upper threshold voltage 142 and the lower threshold voltage 144 is the same and is controllable by a threshold select 146. In another embodiment, the upper threshold voltage 142 and the lower threshold voltage 144 may be programmed to different values. Furthermore, the upper and lower threshold voltage values 142 and 144 may be programmed to be the same or different than the upper and lower threshold voltage values 102 and 104.

The upper threshold voltage 142 and the lower threshold voltage 144 are each compared against a voltage difference between a feedback voltage 145 and the reference voltage 56 with respective comparators 148 and 150 to generate respective clamping signals 154 and 156, which may activate respective clamping transistors 158 and 160. The feedback voltage 145 is measured between the correction resistor 100 and the ESD resistor 68, where the ESD resistor 68 has less resistance than the correction resistor 100. The respective clamping transistors 158 and 160 operate between a dirty voltage supply 134 and the ground 128. In some embodiments, the direct correct to the line voltage 28 is a coarse correction and the correction to the feedback voltage 58 is finer correction. In some embodiments, the direct correction (or clamping) to the line voltage 28 and the indirect correction (or clamping) to the feedback voltage 58 may be used separately or in combination.

Figure 7:
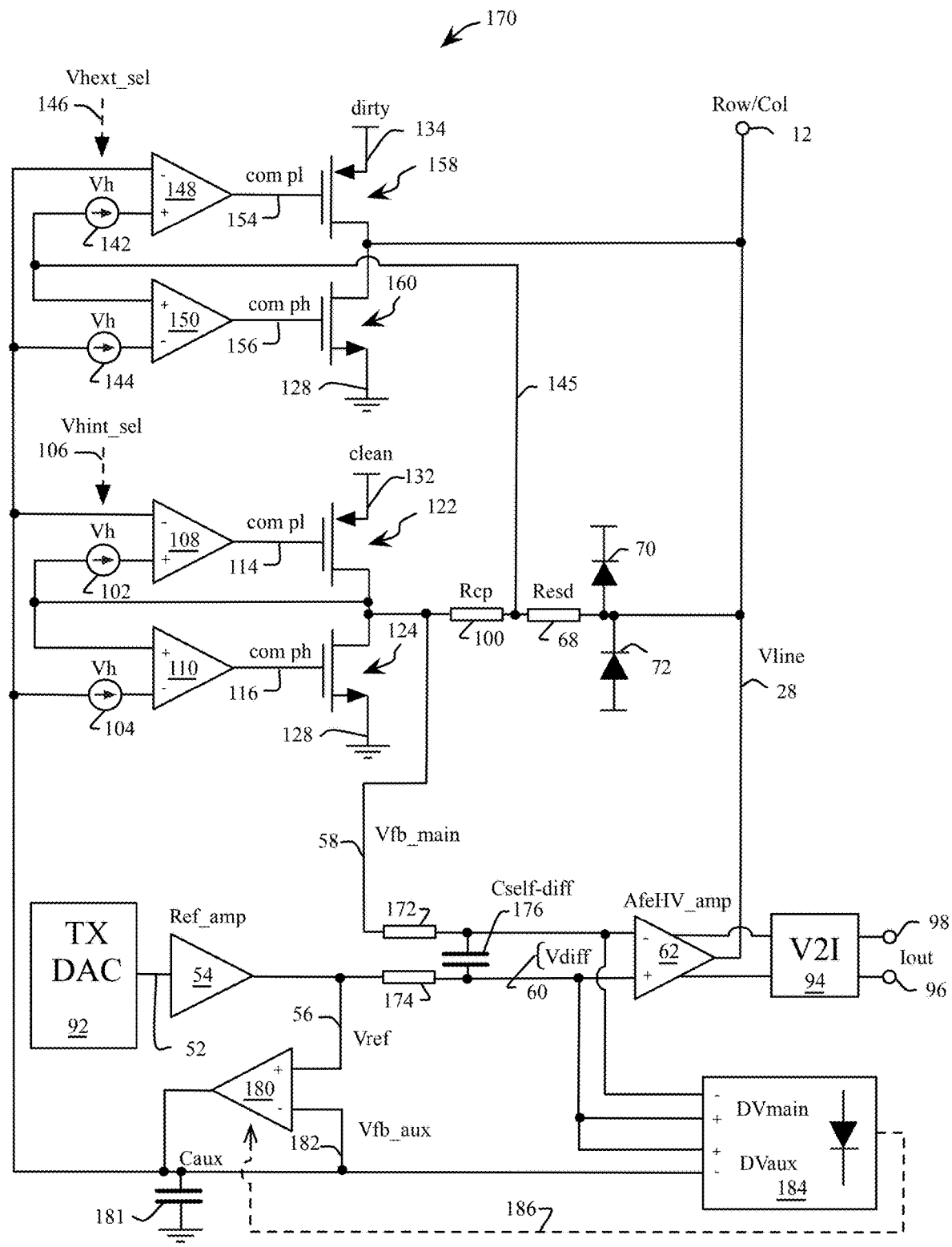
FIG. 7 is a schematic view of another apparatus for display noise cancelling in a touch sensing system, in accordance with an embodiment of the present disclosure.

FIG. 7 shows another apparatus for display noise cancelling in a touch sensing system, in accordance with an embodiment 170 of the present disclosure. With continued reference to FIG. 5 and FIG. 6, the embodiment 170 of FIG. 7 extends the corrections applied to one or more of the feedback voltage 58 and the line voltage 28 by further correcting for the capacitive nature of the capacitive touch panel. Specifically, the reference voltage difference Vdiff 60 is dependent upon the self capacitance Cself 34 and 35 (see FIG. 1) of the respective row 12 or column 13 and the operating frequency FTX (e.g. the signal band 46 of FIG. 1) in accordance to equation [1], where VTX is the transmitter voltage 18, "pi" is a mathematical constant equal to a circle's circumference divided by its diameter, and Gm is a transconductance of the amplifier 62 (see FIGS. 5-7).

$$Vdiff = Iout/Gm = VTX * Cself * 2pi * FTX/Gm \qquad [1]$$

With regards to the embodiments of FIGS. 5 and 6, the reference voltage Vref 56 is used to compare voltage thresholds for the feedback voltage 58 and the line voltage 28. However, this constrains the choice of threshold voltages 102, 104, 142 and 144 so that clamping of the feedback voltage 58 or line voltage 28 only limits coupled voltages 80 or 82 from the display 30, rather than the transmitted signal 52 and any shifts to the transmitted signal 52 resulting from a capacitive touch to the row or column 12. Otherwise, the output current (e.g. 96 and 98) would not represent Gm* (Vref-Vfb_main). When a transconductance amplifier (e.g. the amplifier 62) drives a capacitor (e.g., the self capacitance 34 or 35), the feedback voltage 58 lags its input, where in the differential input voltage 60 is given by equation [1].

Hence, the thresholds 102 and 104 used to clamp an overvoltage 80 must include an additional margin dV for the dependency of Vdiff on Cself and FTX in accordance to equation [2]. Similarly, the thresholds 104 and 144 used to clamp an undervoltage 82 must include an additional margin dV for the dependency of Vdiff on Cself and FTX in accordance to equation [3].

$$\text{Vth\_up} = Vref + Vdiff + dV \quad [2]$$

$$\text{Vth\_do} = Vref - Vdiff - dV \quad [3]$$

Consequently, when Gm is very large then Vdiff is correspondingly very small and dV may be reduced. However, Iout will then be more easily disturbed by noise coupling from the display 30. Conversely, when Gm is very small, there is less disturbance to Iout (for the same voltage coupling onto Vline 28), however dV must then be increased. In one embodiment, the value of dV is determined empirically from simulations and statistical analysis using anticipated fabrication process, voltage and temperature variations.

Preferentially, the reference voltage Vref 56 should track the feedback voltage 58 without any overvoltage or undervoltage due to noise coupling from the display 30. To achieve this goal, an auxiliary feedback voltage 182 may be generated to be used as a reference for the correction system (rather than using Vref 56), thus allowing a reduction in the voltage threshold values 102, 104, 142 and 144. Consequently, the Gm of the amplifier 62 may also be reduced without adversely affecting signal integrity and thus allow for a larger Vdiff 60 with less sensitivity to process spread or mismatch.

In one embodiment, additional low pass filtering may be applied to the input of the amplifier 62 with resistors 172 and 174 in series with the negative and positive inputs of the amplifier 62 respectively, and a Cself-diff capacitor 176 across the negative and positive inputs of the amplifier 62. An auxiliary amplifier 180, loaded by an auxiliary capacitor Caux 181, may generate an auxiliary reference voltage Vfb_aux 182 from a differential signal formed by the difference between Vref 56 and Vfb_aux 182. The drive of the auxiliary amplifier 180 may depend on frequency, similar to the amplifier 62 and operate according to equation [4], where Gm-aux is the transconductance of the auxiliary amplifier 180.

$$(Vref - Vfb\_aux) = Vref * Caux * 2pi * FTX / \text{Gm\_aux} \quad [4]$$

A peak detector 184 sensing a voltage amplitude difference between Vref 56 and Vfb_aux 182, as well as between Vref 56 and Vfb_main 58 to generate a control signal 186, which controls a current source to regulate the transconductance Gm_aux of the auxiliary amplifier 180 according to equation [5], thereby providing an auxiliary feedback signal Vfb_aux 182 independent of capacitance and frequency.

$$\text{Gm\_aux} = Gm * Caux / Cself - diff \quad [5]$$

The embodiment 170 of FIG. 7 may be further modified to include chopping or offset calibration techniques to minimize offsets between the differential inputs to the peak detector 184. In another embodiment, enable and disable controls may be added to selectively control clamping of the line voltage 28, clamping of the feedback voltage 58 or both the line voltage 28 and the feedback voltage 58. In another embodiment, the voltage thresholds 102, 104, 142 and 144 may be controlled individually, in groups, or adaptively. In another embodiment, the reference voltage 56 and the auxiliary reference voltage 182 may be selected with a multiplexer for use with the clamping circuits.

Figure 8:
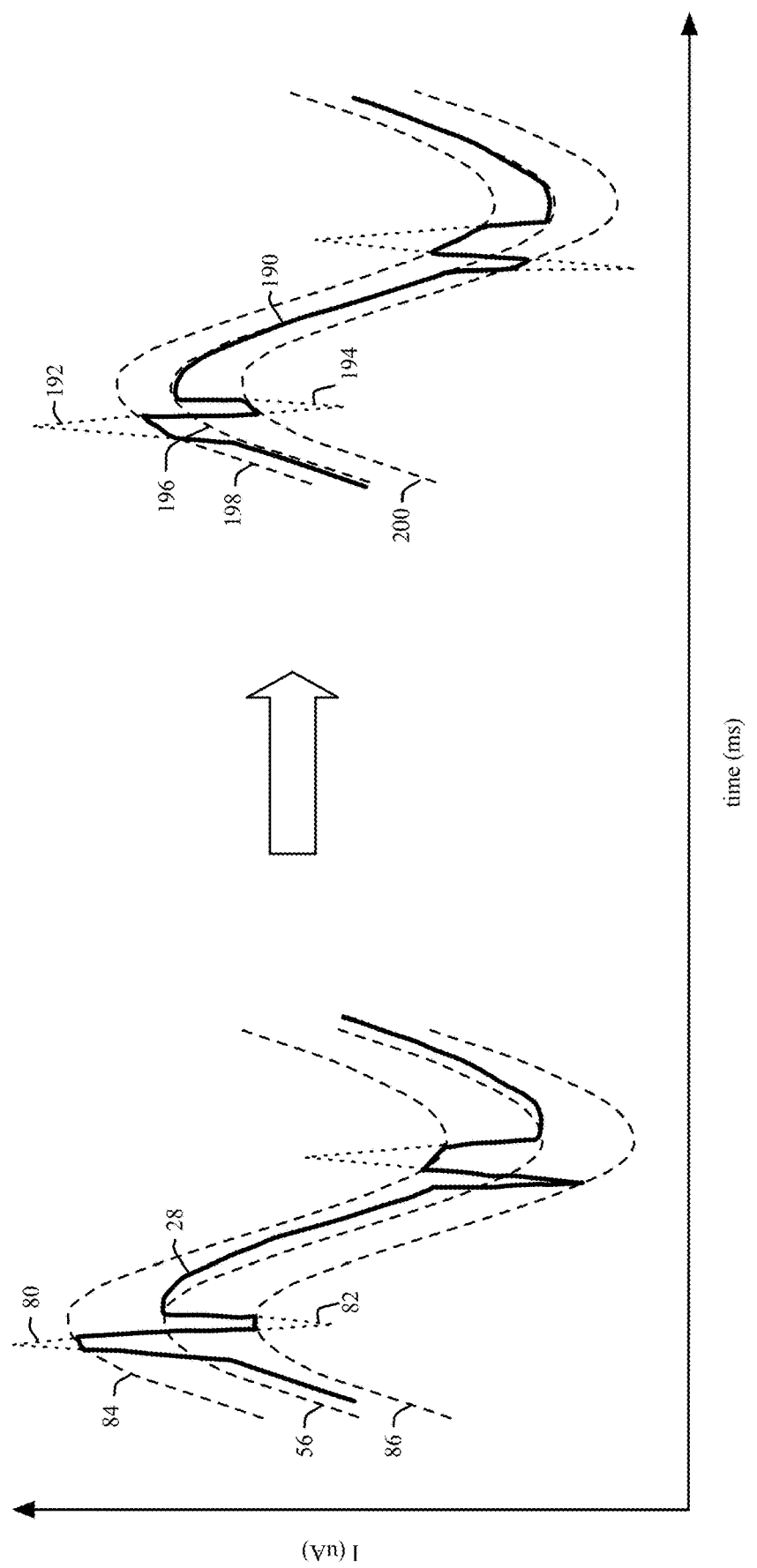
FIG. 8 is a graphical view of the further reduction in electrical interference over the embodiments of FIG. 5 and FIG. 6 using the embodiment of FIG. 7.

FIG. 8 shows the reduction in electrical interference from the display 30 over the embodiments of FIG. 5 and FIG. 6 by using the embodiment of FIG. 7. With reference to FIG. 4 and FIG. 8, by using the auxiliary amplifier 180, the dependency of Vdiff 60 on capacitance and frequency is reduced, such that Vfb_aux 182 is more closely matched to the line voltage Vline 190. Accordingly, the value of the upper voltage threshold 198 (e.g., 102 and 142 of FIG. 7) may be reduced to provide more clamping of the overvoltage 192. Similarly, the value of the lower voltage threshold 200 (e.g., 104 and 144 of FIG. 7) may be reduced to provide more clamping of the undervoltage 194.

Figure 9:
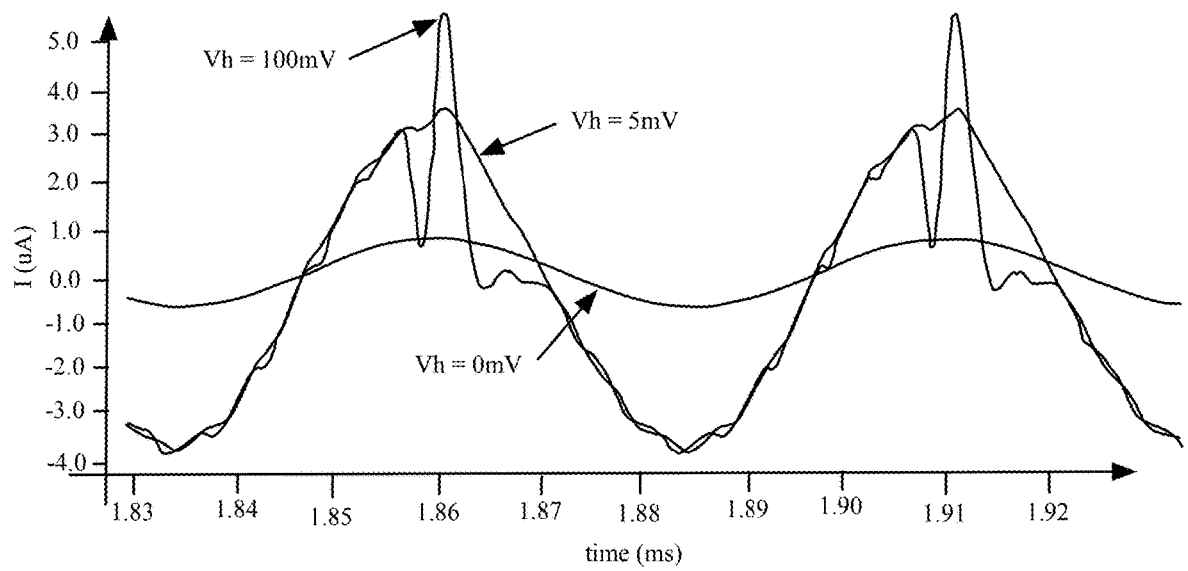
FIG. 9 is a graphical view of the reduction in electrical interference for the embodiment of FIG. 7.

FIG. 9 shows the reduction of electrical interference from the display 30 for the embodiment of FIG. 7. In FIG. 9, the voltage thresholds 102, 104, 142 and 144 are set to be equal and plotted for 0 mV, 5 mV and 100 mV. With the exception of 0 mV, which partly cancels out the line voltage signal 28, all other threshold settings show a good preservation of the signal amplitude with less clamping as the threshold is raised.

Figure 10:
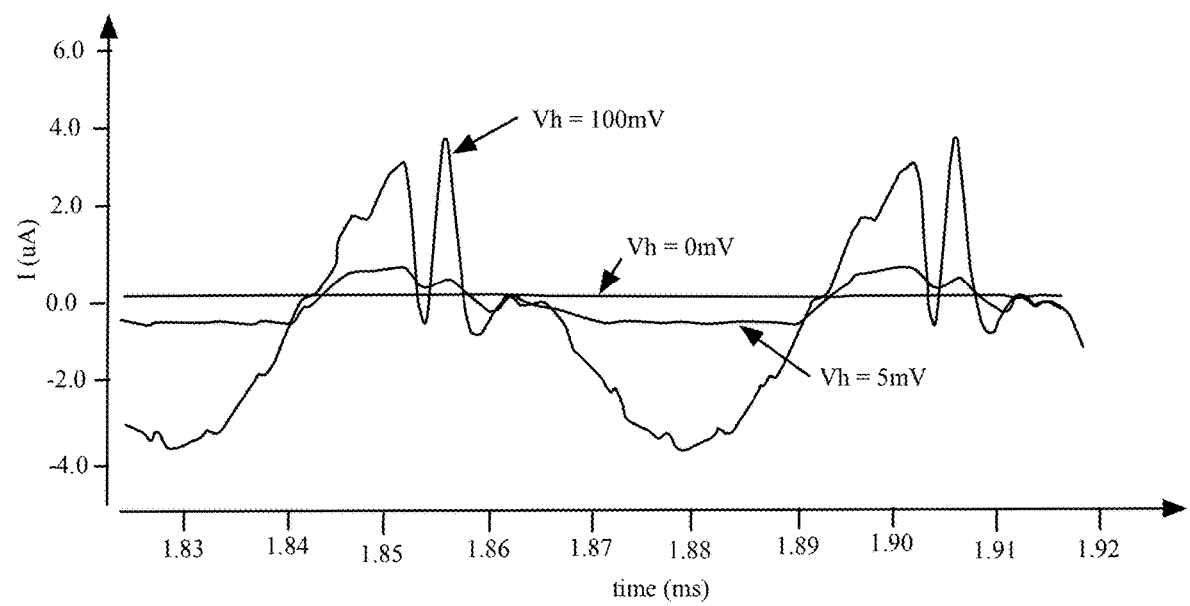
FIG. 10 is a graphical view of the reduction in electrical interference for the embodiments of FIG. 5 and FIG. 6.

FIG. 10 shows the reduction of electrical interference from the display 30 for the embodiments of FIG. 5 and FIG. 6. In FIG. 10, the voltage thresholds 102, 104, 142 and 144 are set to be equal and plotted for 0 mV, 5 mV and 100 mV. In contrast to FIG. 9, the line voltage 28 is always attenuated by the clamping circuits, except when the threshold voltage is very high (e.g., 100 mV), where the electrical interference is significant. With threshold voltage settings between 0 mV and 30 mV, the output current 96 and 98 is supplied in part by the clamping circuit itself, hence reducing the fidelity of the capacitive touch panel.

Figure 11:
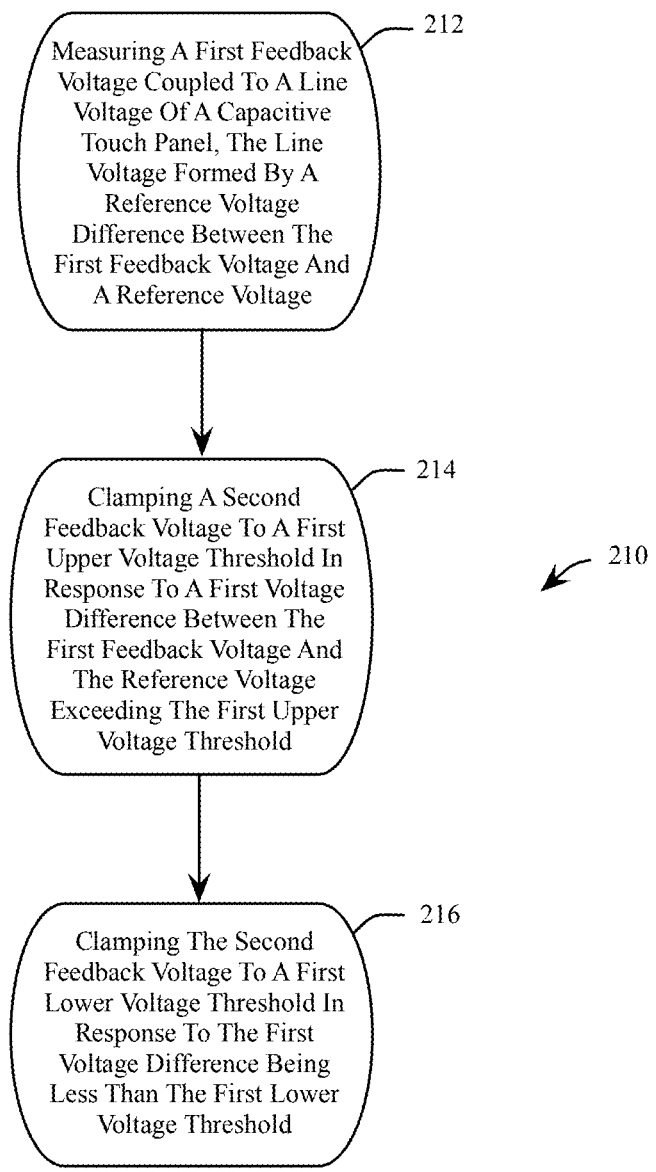
FIG. 11 is a flowchart representation of a method for display noise canceling in a touch sensing system, in accordance with an embodiment of the present disclosure.

FIG. 11 shows an embodiment 210 of a method for display noise canceling in a touch sensing system. With reference to FIG. 5, FIG. 6 and FIG. 11 at 212, a first feedback voltage 58 (or 145) is coupled to a line voltage 28 of a capacitive touch panel 10. The line voltage 28 is formed by a reference voltage difference 60 between the first feedback voltage 58 and a reference voltage 56. At 214, a second feedback voltage 58 (or 28) is clamped to a first upper voltage threshold 102 (or 142) in response to a first voltage difference between the first feedback voltage 58 (or 145) and the reference voltage 56 exceeding the first upper voltage threshold 102 (or 142). At 216, the second feedback voltage 58 (or 28) is clamped to a first lower voltage threshold 104 (or 144) in response to the first voltage difference being less than the first lower voltage threshold 104 (or 144).

Figure 12:
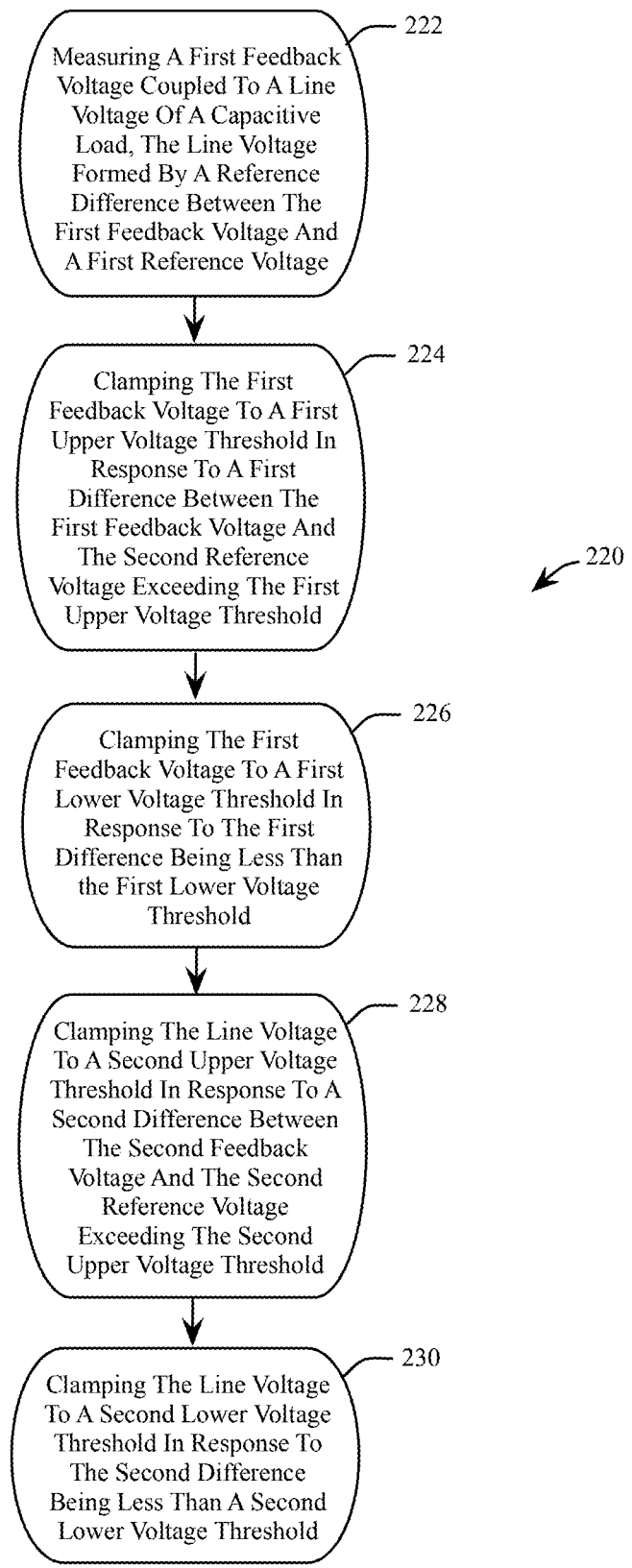
FIG. 12 is a flowchart representation of another method for display noise canceling in a touch sensing system, in accordance with an embodiment of the present disclosure.

FIG. 12 shows an embodiment 220 of a method for display noise canceling in a touch sensing system. With reference to FIG. 6 and FIG. 12 at 222 a first feedback voltage 58 coupled to a line voltage 28 of a capacitive load (e.g., Cself 34 or 35 with or without capacitive alteration due to a finger touch) is measured. The line voltage 28 is formed by a reference difference 60 between the first feedback voltage 58 and a first reference voltage 56. At 224, the first feedback voltage 58 is clamped to a first upper voltage threshold 102 in response to a first difference between the first feedback voltage 58 and the second reference voltage 56 exceeding the first upper voltage threshold. At 226, the first feedback voltage 58 is clamped to a first lower voltage threshold 104 in response to the first difference 60 being less than the first lower voltage threshold 104. At 228, the line voltage 28 is clamped to a second upper voltage threshold 142 in response to a second difference between the second feedback voltage 145 and the second reference voltage 56 exceeding the second upper voltage threshold 142. At 230, the line voltage 28 is clamped to a second lower voltage threshold 144 in response to the second difference being less than a second lower voltage threshold 144.

A method for display noise canceling in a touch sensing system includes measuring a first feedback voltage of a feedback node resistively coupled to a line voltage of a capacitive touch panel, the line voltage formed by a continuous wave output of an amplifier responsive to a reference voltage difference between the first feedback voltage and a reference voltage. A second feedback voltage is clamped to a first upper voltage threshold in response to a first voltage difference between the first feedback voltage and the reference voltage being greater than the first upper voltage threshold. The second feedback voltage is clamped to a first lower voltage threshold in response to the first voltage difference being less than the first lower voltage threshold.

As will be appreciated, at least some of the embodiments as disclosed include at least the following. In one embodiment, a method for display noise canceling in a touch sensing system comprises measuring a first feedback voltage of a feedback node resistively coupled to a line voltage of a capacitive touch panel, the line voltage formed by a continuous wave output of an amplifier responsive to a reference voltage difference between the first feedback voltage and a reference voltage. A second feedback voltage is clamped to a first upper voltage threshold in response to a first voltage difference between the first feedback voltage and the reference voltage being greater than the first upper voltage threshold. The second feedback voltage is clamped to a first lower voltage threshold in response to the first voltage difference being less than the first lower voltage threshold.

Alternative embodiments of the method for display noise canceling in a touch sensing system include one of the following features, or any combination thereof. The amplifier generates a current output to drive a capacitive load of the capacitive touch panel, wherein the current output is responsive to a change to the capacitive load. The capacitive touch panel is resistively coupled to the feedback node through a pair of serially connected resistors, wherein the first feedback voltage is the second feedback voltage. The capacitive touch panel is resistively coupled to the feedback node through a first resistor serially connected to a second resistor, the first feedback voltage measured between the first resistor and the second resistor, the second feedback voltage being the line voltage, and the first resistor connected to the capacitive touch panel and comprising a first resistance being less than a second resistance of the second resistor. The capacitive touch panel is resistively coupled to the feedback node through a first resistor serially connected to a second resistor, the first resistor connected to the capacitive touch panel and comprising a first resistance being less than a second resistance of the second resistor, the first feedback voltage is the second feedback voltage, clamping the line voltage to a second upper voltage threshold in response to a second voltage difference between a third feedback voltage and the reference voltage being greater than the second upper voltage threshold, and clamping the line voltage to a second lower voltage threshold in response to the second voltage difference being less than the second lower voltage threshold, the third feedback voltage measured between the first resistor and the second resistor. A coarse correction is performed to the line voltage and a fine correction is performed to the second feedback voltage, wherein the second voltage difference is greater than the first voltage difference. At least one of the first upper voltage threshold and the first lower voltage threshold is modified based on a predicted amount of voltage coupling between the capacitive touch panel and a resistively coupled display. An auxiliary amplifier modifies the reference voltage to generate an auxiliary reference voltage, wherein the auxiliary reference voltage is used to determine the first voltage difference, and a transconductance of the auxiliary amplifier is controlled with a peak detector in proportion to a ratio of an auxiliary capacitance of an output of the auxiliary amplifier divided by a self-capacitance between a pair of inputs of the amplifier. The transconductance of the auxiliary amplifier is controlled with a control signal generated by a first control difference between the reference voltage and the auxiliary reference voltage and by a second control difference between the reference voltage and the first feedback voltage. A respective mismatch of at least one of the first control difference and the second control difference is minimized with a chopper stabilizing circuit.

In another embodiment, a method for display noise canceling in a touch sensing system comprises measuring a first feedback voltage of a feedback node resistively coupled to a line voltage of a capacitive load through a first resistor serially connected to a second resistor, the line voltage formed by a continuous wave output of an amplifier responsive to a reference voltage difference between the first feedback voltage and a first reference voltage. The first feedback voltage is clamped to a first upper voltage threshold in response to a first voltage difference between the first feedback voltage and a second reference voltage being greater than the first upper voltage threshold, wherein the second reference voltage is derived from the first reference voltage. The first feedback voltage is clamped to a first lower voltage threshold in response to the first voltage difference being less than the first lower voltage threshold. The line voltage is clamped to a second upper voltage threshold in response to a second voltage difference between a second feedback voltage and the second reference voltage being greater than the second upper voltage threshold. The line voltage is clamped to a second lower voltage threshold in response to the second voltage difference being less than the second lower voltage threshold, the second feedback voltage measured between the first resistor and the second resistor.

Alternative embodiments of the method for display noise canceling in a touch sensing system include one of the following features, or any combination thereof. The first reference voltage is the second reference voltage. An auxiliary amplifier modifies the first reference voltage to generate the second reference voltage, wherein the second reference voltage is used to determine the first voltage difference and the second voltage difference, and a transconductance of the auxiliary amplifier is controlled with a peak detector in proportion to a ratio of an auxiliary capacitance of an output of the auxiliary amplifier divided by a self-capacitance between a pair of inputs of the amplifier. At least one of clamping the first feedback voltage, clamping the line voltage and modifying the first reference voltage is selectively enabled. At least one of the first upper voltage threshold, the first lower voltage threshold, the second upper voltage threshold and the second lower voltage threshold is programmed.

In another embodiment, an apparatus comprises a capacitive touch panel comprising a capacitive load, wherein the capacitive load is alterable by a physical touch, and the capacitive touch panel is resistively coupled to a voltage driven display. An amplifier is configured to generate a time-variant line voltage across the capacitive load in response to a reference voltage difference between a first feedback voltage of a feedback node and a first reference voltage. A first upper threshold comparator is configured to clamp a second feedback voltage to a first upper voltage threshold in response to a first voltage difference between the first feedback voltage and a second reference voltage being greater than the first upper voltage threshold, wherein the second reference voltage is derived from the first reference voltage. A first lower threshold comparator is configured to clamp the second feedback voltage to a first lower voltage threshold in response to the first voltage difference being less than the first upper voltage threshold.

Alternative embodiments of the apparatus include one of the following features, or any combination thereof. The capacitive touch panel is coupled to the feedback node through a pair of serially connected resistors, wherein the first feedback voltage is the second feedback voltage. The capacitive touch panel is resistively coupled to the feedback node through a first resistor serially connected to a second resistor, the first feedback voltage measured between the first resistor and the second resistor, the second feedback voltage being the line voltage, and the first resistor connected to the capacitive touch panel and comprising a first resistance being less than a second resistance of the second resistor. The capacitive touch panel is resistively coupled to the feedback node through a first resistor serially connected to a second resistor, the first resistor connected to the capacitive touch panel and comprising a first resistance being less than a second resistance of the second resistor, the first feedback voltage is the second feedback voltage, a second upper threshold comparator is configured to clamp the line voltage to a second upper voltage threshold in response to a second voltage difference between a third feedback voltage and the reference voltage being greater than a second upper voltage threshold, and a second lower threshold comparator is configured to clamp the line voltage to a second lower voltage threshold in response to the second voltage difference being less than a second lower voltage threshold, the third feedback voltage measured between the first resistor and the second resistor. An auxiliary amplifier is configured to modify the first reference voltage to generate the second reference voltage, wherein the second reference voltage is used to determine the first voltage difference and the second voltage difference, and a transconductance of the auxiliary amplifier is controlled with a peak detector in proportion to a ratio of an auxiliary capacitance of an output of the auxiliary amplifier divided by a self-capacitance between a pair of inputs of the amplifier.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method for display noise canceling in a touch sensing system comprising:
    measuring a first feedback voltage of a feedback node resistively coupled to a line voltage of a capacitive touch panel, the line voltage formed by a continuous wave output of an amplifier responsive to a reference voltage difference between the first feedback voltage and a reference voltage;
    clamping a second feedback voltage to a first upper voltage threshold in response to a first voltage difference between the first feedback voltage and the reference voltage being greater than the first upper voltage threshold; and
    clamping the second feedback voltage to a first lower voltage threshold in response to the first voltage difference being less than the first lower voltage threshold.

2. The method of claim 1 further comprising generating with the amplifier, a current output to drive a capacitive load of the capacitive touch panel, wherein the current output is responsive to a change to the capacitive load.

3. The method of claim 1 further comprising resistively coupling the capacitive touch panel to the feedback node through a pair of serially connected resistors, wherein the first feedback voltage is the second feedback voltage.

4. The method of claim 1 further comprising resistively coupling the capacitive touch panel to the feedback node through a first resistor serially connected to a second resistor, the first feedback voltage measured between the first resistor and the second resistor, the second feedback voltage being the line voltage, and the first resistor connected to the capacitive touch panel and comprising a first resistance being less than a second resistance of the second resistor.

5. The method of claim 1 further comprising resistively coupling the capacitive touch panel to the feedback node through a first resistor serially connected to a second resistor, the first resistor connected to the capacitive touch panel and comprising a first resistance being less than a second resistance of the second resistor, the first feedback voltage is the second feedback voltage,
    clamping the line voltage to a second upper voltage threshold in response to a second voltage difference between a third feedback voltage and the reference voltage being greater than the second upper voltage threshold, and
    clamping the line voltage to a second lower voltage threshold in response to the second voltage difference being less than the second lower voltage threshold, the third feedback voltage measured between the first resistor and the second resistor.

6. The method of claim 5 further comprising performing a coarse correction to the line voltage and a fine correction to the second feedback voltage, wherein the second voltage difference is greater than the first voltage difference.

7. The method of claim 1 further comprising modifying at least one of the first upper voltage threshold and the first lower voltage threshold based on a predicted amount of voltage coupling between the capacitive touch panel and a resistively coupled display.

8. The method of claim 1 further comprising modifying with an auxiliary amplifier, the reference voltage to generate an auxiliary reference voltage, wherein the auxiliary reference voltage is used to determine the first voltage difference, and a transconductance of the auxiliary amplifier is controlled with a peak detector in proportion to a ratio of an auxiliary capacitance of an output of the auxiliary amplifier divided by a self-capacitance between a pair of inputs of the amplifier.

9. The method of claim 8 wherein the transconductance of the auxiliary amplifier is controlled with a control signal generated by a first control difference between the reference voltage and the auxiliary reference voltage and by a second control difference between the reference voltage and the first feedback voltage.

10. The method of claim 9 further comprising minimizing a respective mismatch of at least one of the first control difference and the second control difference with a chopper stabilizing circuit.

11. An apparatus comprising:
a capacitive touch panel comprising a capacitive load, wherein the capacitive load is alterable by a physical touch, and the capacitive touch panel is resistively coupled to a voltage driven display;
an amplifier configured to generate a time-variant line voltage across the capacitive load in response to a reference voltage difference between a first feedback voltage of a feedback node and a first reference voltage;
a first upper threshold comparator configured to clamp a second feedback voltage to a first upper voltage threshold in response to a first voltage difference between the first feedback voltage and a second reference voltage being greater than the first upper voltage threshold, wherein the second reference voltage is derived from the first reference voltage; and
a first lower threshold comparator configured to clamp the second feedback voltage to a first lower voltage threshold in response to the first voltage difference being less than the first upper voltage threshold.

12. The apparatus of claim 11 wherein the capacitive touch panel is coupled to the feedback node through a pair of serially connected resistors, wherein the first feedback voltage is the second feedback voltage.

13. The apparatus of claim 11 wherein the capacitive touch panel is resistively coupled to the feedback node through a first resistor serially connected to a second resistor, the first feedback voltage measured between the first resistor and the second resistor, the second feedback voltage being the line voltage, and the first resistor connected to the capacitive touch panel and comprising a first resistance being less than a second resistance of the second resistor.

14. The apparatus of claim 11 wherein the capacitive touch panel is resistively coupled to the feedback node through a first resistor serially connected to a second resistor, the first resistor connected to the capacitive touch panel and comprising a first resistance being less than a second resistance of the second resistor, the first feedback voltage is the second feedback voltage,
a second upper threshold comparator configured to clamp the line voltage to a second upper voltage threshold in response to a second voltage difference between a third feedback voltage and the reference voltage being greater than a second upper voltage threshold, and
a second lower threshold comparator configured to clamp the line voltage to a second lower voltage threshold in response to the second voltage difference being less than a second lower voltage threshold, the third feedback voltage measured between the first resistor and the second resistor.

15. The apparatus of claim 11 further comprising an auxiliary amplifier configured to modify the first reference voltage to generate the second reference voltage, wherein the second reference voltage is used to determine the first voltage difference and the second voltage difference, and a transconductance of the auxiliary amplifier is controlled with a peak detector in proportion to a ratio of an auxiliary capacitance of an output of the auxiliary amplifier divided by a self-capacitance between a pair of inputs of the amplifier.

16. A method for display noise canceling in a touch sensing system comprising:
measuring a first feedback voltage of a feedback node resistively coupled to a line voltage of a capacitive load through a first resistor serially connected to a second resistor, the line voltage formed by a continuous wave output of an amplifier responsive to a first voltage difference between the first feedback voltage and a first reference voltage;
clamping the first feedback voltage to a first upper voltage threshold in response to a second voltage difference between the first feedback voltage and a second reference voltage being greater than the first upper voltage threshold, wherein the second reference voltage is derived from the first reference voltage;
clamping the first feedback voltage to a first lower voltage threshold in response to the second voltage difference being less than the first lower voltage threshold;
clamping the line voltage to a second upper voltage threshold in response to a second voltage difference between a second feedback voltage and the second reference voltage being greater than the second upper voltage threshold; and
clamping the line voltage to a second lower voltage threshold in response to the second voltage difference being less than the second lower voltage threshold, the second feedback voltage measured between the first resistor and the second resistor.

17. The method of claim 16 wherein the first reference voltage is the second reference voltage.

18. The method of claim 16 further comprising modifying with an auxiliary amplifier, the first reference voltage to generate the second reference voltage, wherein the second reference voltage is used to determine the first voltage difference and the second voltage difference, and a transconductance of the auxiliary amplifier is controlled with a peak detector in proportion to a ratio of an auxiliary capacitance of an output of the auxiliary amplifier divided by a self-capacitance between a pair of inputs of the amplifier.

19. The method of claim 16 further comprising selectively enabling at least one of clamping the first feedback voltage, clamping the line voltage and modifying the first reference voltage.

20. The method of claim 16 further comprising programming at least one of the first upper voltage threshold, the first lower voltage threshold, the second upper voltage threshold and the second lower voltage threshold.

* * * * *